United States Patent [19]

Deibel

[11] Patent Number: 5,116,499
[45] Date of Patent: * May 26, 1992

[54] HIGH-STRENGTH SPIN-ON TUBE FILTER

[76] Inventor: Richard J. Deibel, 501 Pine St., Bamberg, S.C. 29003

[*] Notice: The portion of the term of this patent subsequent to Jun. 18, 2008 has been disclaimed.

[21] Appl. No.: 470,053

[22] Filed: Feb. 25, 1990

[51] Int. Cl.⁵ .............................................. B01D 27/08
[52] U.S. Cl. ...................................... 210/232; 210/441; 210/446; 210/454; 55/510
[58] Field of Search ............. 210/440, 441, 443, 450, 210/452, 446, 416.4, 454, 416.5, 232, 447, 130, 497.01, 497.1, DIG. 17; 55/508, 510, 490, 492

[56] References Cited

U.S. PATENT DOCUMENTS

| | | | |
|---|---|---|---|
| 4,369,113 | 1/1983 | Stifelman | 210/DIG. 17 |
| 4,743,374 | 5/1988 | Stifelman | 210/443 |
| 4,834,885 | 5/1989 | Misgen et al. | 210/440 |

Primary Examiner—Robert A. Dawson
Assistant Examiner—Wanda L. Millard

[57] ABSTRACT

A high-strength spin-on tube filter with improved fatigue life and higher operating pressure capability. The tubular style filter housing being of a unitary construction utilizes metal tubing rather than the commonly used deep-drawn thin gauge malleable metal can having the closed end of the internal filter element being the closed structural metal endcap, or cover, of the housing can. The specification discloses a new state of the art unitary construction method having several major improvements over prior art that will be of a benefit to the industry.

5 Claims, 2 Drawing Sheets

HIGH-STRENGTH SPIN-ON TUBE FILTER

CROSS REFERENCE TO RELATED APPLICATIONS

Invention: High-Strength Quick-Disconnect Tube Filter—"Dei-Quik"; High-Strength Disposable Tube Filter and Head—"Rotomax".

Inventor: Richard Jefferson Deibel—United States citizen; 501 Pine Street, Bamberg, S.C. 29003, (803) 245-4038.

Date: Jan. 22, 1990.

RELATIONSHIP OF INVENTIONS

Three patent applications by Deibel, dated Jan. 22, 1990, are for separately and individually unique tube filter products. Each invention incorporates a new state of the art unitary tube filter housing constructed in a configuration applicable to specifically defined markets and applications.

TECHNICAL FIELD

The present tube filter invention relates generally to spin-on, twist-on, type disposable filtering devices. Particularly, this invention is a state of the art high-strength disposable filter housing made by welding a folded portion of a metal tube over a peripheral lip of a metal structural endcap to form a cylindrical can style filter housing. Furthermore, this invention utilizes the same metal endcap for the closed structural end of the housing and for the closed endcap of the internal filter element.

BACKGROUND ART

Spin-on, twist-on, type filters are used in numerous liquid and pneumatic applications thoughout the agricultural, mobile, commercial and industrial market places. Prior art spin-on disposable filter products are manufactured using a thin gauge metal can, or housing, made by deep-draw forming malleable metals. This technique limits the structural capabilities of current spin-on, twist-on, type disposable products to the production capabilities of the metal forming industry and to the molecular characteristics of a limited number of specific malleable metals. Prior art uses a stamped steel or cast cover plate to secure the can to a mounting and distribution head assembly. This plate typically has a threaded center hole and is spot welded and/or crimp sealed to a deep-drawn can. These techniques for sealing and connecting the can to the plate, plus the structural limits of thin gauge malleable metals, generally restrict the applicational uses of prior art spin-on, twist-on, disposable filters. Some new high pressure, high-strength, disposable filter housings with burst pressure ratings in the 1,000 psi range have been developed for some narrowly defined markets and applications. However, even these newer high-strength filters remain applicationally limited because of their continued use of deep-drawn metal cans.

Another typical design common to prior art spin-on, twist-on, type filters is the necessity of manufacturing a separate filter element to be installed, along with various separator devices, into the filter housing. A separate and segregated filter element cartridge is subject to different cyclical operational loads than those experienced by the filter housing. Current internal filter cartridge designs do not properly protect against seal distortion or wear deterioration caused by applicational flow dynamics and vibration. Such seal distortion and wear deterioration lessens a filters contamination removal efficiency by allowing contaminated fluid to by-pass the filter medium.

Examples of prior art limitations can be found in U.S. Pat. No. 4,719,012 and more recently U.S. Pat. No. 4,743,374 issued as an improvement over earlier U.S. Pat. No. 4,369,113. Each of these designs incorporates the continued use of a deep-drawn thin gauge metal can having a separate and segregated internal filter cartridge. Rated fatigue pressure is in the 500 psi range and burst pressure ratings are in the 1,000 psi range. These prior art pressure limitations leave a major product void in the high-strength disposable filter market.

Thus, a need exists for an improved structural spin-on, twist-on, style disposable filter with higher pressure capacity, a better fatigue rating, one that eliminates the need for a segregated internal filter cartridge, and a filter product that decreases by-pass losses caused from distorted or deteriorated internal filter seals. The present tube invention is designed to overcome one or more of the problems as set forth above.

SUMMARY OF INVENTION

The present high-strength spin-on style tube filter invention is a new and unique product design which overcomes the foregoing limitations associated with the prior art. The filter housing and internal filtering element cartridge utilize and share the same endcap to form a single unitary design that provides a rigid bonded support system within the invention thus eliminating the need for springs, spacers, pressure equalization passages, or a separate segregated filter element. The use of various gauges of metal tubing for structural integrety can permit higher ranges of operating pressures and expanded applicational opportunities. In general terms, the present spin-on invention is a sealed unitary cylindrical metal tube style filter having a housing comprised of two structural metal endcaps welded to a metal tube incorporating an internal filter element inside. The closed, noncommunicating, end of the housing is constructed by folding a portion of a metal tube over the peripheral lip of a structural metal endcap common to both the internal filter element and the external housing. A circumferential weld consolidates and seals the engaging components. The fluid communicating, or open end, is constructed by folding a portion of a metal tube over the peripheral lip of a structural metal endcap having a circumferential o-ring groove, plural circumferentially spaced fluid passage conduits, and a inward protruding internally threaded connector post. The internal component of the invention is a unitarily constructed cylindrical solid particulate removal filtering element capable of incorporating a variety of mediums, such as, but not limited to, cellulose and micro fiberglass mediums. The open end, or fluid communicating end, of the internal filtering element engages to the connector post of the unitary attachment plate of the housing. The filtering element has a central fluid passage provided by a perforated metal support core. The support core and filtering medium are secured and sealed with adhesive materials potted, or installed, in the internal element open endcap and the structural closed endcap of the external housing. The fluid communicating and attaching open endcap of the housing has a recessed o-ring groove provision to provide a positive seal between the engaging spin-on filter and a permanently installed mounting and fluid distribution head assembly.

BRIEF DESCRIPTION OF DRAWINGS

A better understanding of the invention can be had by reference to the following Detailed Description in conjunction with the accompanying Drawings, wherein.

DETAILED DESCRIPTION

Figure 1:
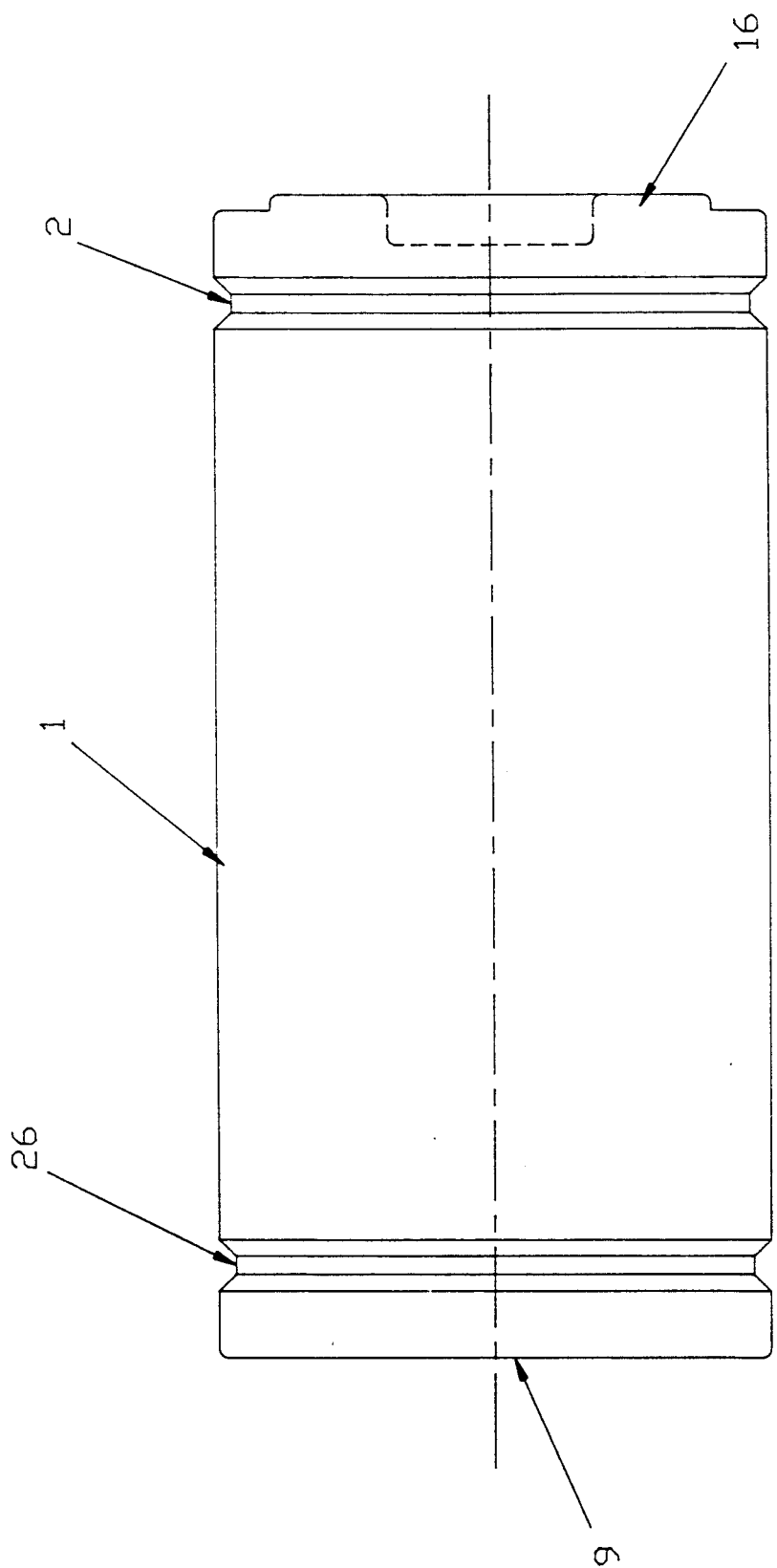
FIG. 1 is a view of an embodiment of the present invention.
Figure 2:
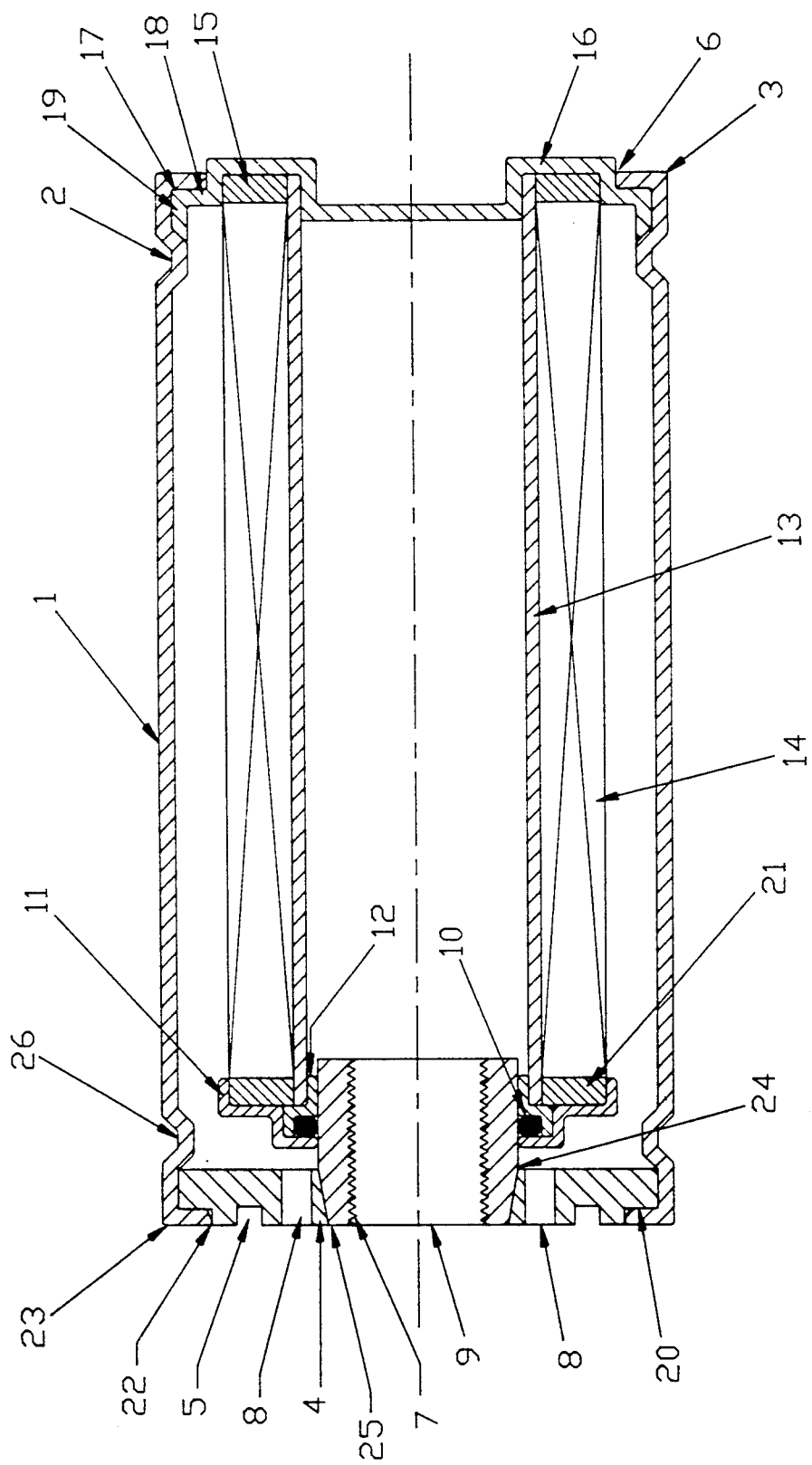
FIG. 2 is a cross-sectional view of the invention.

Referring now to the Drawings, wherein like reference numerals designate like or corresponding elements throughout the views, and particularly referring to FIGS. 1 and 2, there is shown a high-strength spin-on tube filter incorporating a first embodiment of the invention. As will be explained more fully hereinafter, the filter is particularly adaptable for the removal of solid particulates from hydraulic and lubricating oils in systems or applications operating at higher pressures. The spin-on tube filter is comprised of components 1,4,7,10,11,12,13,14,15, and 16 as particularly described in detail in the following explanation as to how each part is incorporated into a unitary constructed spin-on filter. Preliminary test results have confirmed the present high-stength spin-on tube filter will endure operating pressures on the order of 1,200 psi and burst pressures in the 3,000 psi range. The present filter is descriptively referred to as a tube filter specifically because it is constructed utilizing metal tubing 1 as the main structural component of the cylindrical housing 1,4,7,16 rather than a deep-drawn can know in the art. The tube 1 is generally made from metals such as cold steel, stainless steel, aluminum, or other suitable material know in the art to be capable of functioning at higher pressures. This variety of readily available metal tubing permits more design flexibility with respect to envelope sizes and applicational requirements. The tube filter housing, as shown in FIG. 1, FIG. 2 is comprised of a metal tube 1, a structural closed endcap 16, and an open end attachment plate 4,7 unitarily constructed being an internally threaded connector post 7 and a cover plate 4. The structural closed endcap 16 is a metal, or other suitable material, component functioning as the closed end of the housing 1,4,7,16 and as the closed endcap for the internal filtering element 11,12,13,14. The structural endcap 16 is in a configured shape having a recessed reservior area for engaging support core 13, filtering medium 14, and bonding adhesive 15. Endcap 16 functions as an external structural component of the tube can 1,16 during construction and as the closed endcap of the filter element inside the housing 1,4,7,16. Endcap 16 is configured in much the same shape as a typically internal filter element cartridge endcap know to art with the exception of an additional bend 17 and retaining wall 19 being formed to create a peripheral lip and surface area 18, to accommodate the end section of the tube 1 being folded inward 3 over the outer circumference of the endcap 16 to form the closed end of the can 1,16. The closed endcap 16 is positioned in the tube 1 in such a manner that it engages an inward groove 2 formed in the tube 1 wall as a positive seat for the endcap 16 and to add additional structural strength to the can 1,16. Strategically placed, the inward groove 2 serves as a positioning guide and a locking groove for production fixturing during the construction of the can and housing. The closed end 16 configuration of the can 1,16 is similiar in appearance to a deep-drawn can know in the art and commonly used as the housing component of disposable spin-on filters. The endcap 16 is secured and sealed by a continuous circumferential weld 6 on the inward lapping edge of the metal tube 1 at the point of engagement and/or the edge of the inner most circumference of the inward folded 3 tube wall 1 being uniformly seated and firmly positioned on the peripheral lip surface area 18 of the endcap 16. Several types of welding technologies are applicable depending on the material specifications of the tube 1 and endcap 16. Laser welding is preferably utilized due to weld joint aesthetics and bonding features of more recently developed laser technology. This particular method of constructing a closed and sealed can 1,16 is a critical feature of the present invention. This method of can and housing construction results in several positive improvements over prior art spin-on filter housing designs such as; it offers a variety of material choices for improved fluid compatability; it offers a variety of material choices for improved high-strength housings; it offers a variety of material choices to improve fatigue and burst ratings; it permits an infinite variety of size variations; and among other less immediately recognizable benefits, it offers additional filter design opportunities not currently available with the use or deep-drawn thin gauge malleable metal cans.

The fluid communicating and open end of the filter housing is a unitary attachment plate 4,7 comprised of a metal, or other suitable material, structural cover plate 4 and a metal, or other suitable material, internally threaded connector post 7. Structural cover plate 4 and connector post 7 are integrated and sealed by a circumferential weld 24 on the interior side of the cover plate 4 at the point of engagement 25 being the outer most circumference of the tapered area on connector post 7 forming a unitary attachment plate 4,7 assembly having a threaded center opening 9 adapted to threadedly engage an externally threaded attachment post (not shown) of a mating fluid distribution and/or mounting head assembly. The typical attachment post is well-known to those skilled in the art of spin-on filter design, manufacture and use, has an axial fluid flow opening in communication with the suitable flow means in the mounting and/or distribution base to enable fluid to flow bi-directionally according to applicational specifications. The unitary structural attachment plate 4,7 has an internally threaded center opening 9, an o-ring groove 5, a peripheral lip surface area 20, and a plurality of circumferential fluid flow openings 8 that serve as flow ports whereby fluid to be filtered is distributed and circulated in a flow path appropriate to the internal filter element design and location within the housing. The precise number of fluid openings and spacing therebetween are not critical to the practice of the invention. The unitary spin-on filter housing 1,4,7,16 is constructed by folding 23 the open end of the can 1,16 inward over the peripheral lip surface area 20 of attachment plate 4,7 and circumferential welding 22 the folded 23 tube wall 1 in the same appropriate method and manner as described heretofore for the construction of the can 1,16. The integrating connections between tube wall 1 and structural endcap 16 and the connection between the can 1,16 and the unitary attachment plate 4,7 comprise a critical feature of the present invention. A filter element assembly is positioned inside the unitary filter housing 1,4,7,16. The element assembly comprises an o-ring 10, an endcap 11 having a center opening to receive a portion of connector post 7, an o-ring 10 groove provision formed cooperatively with the communication of retaining ring 12, a perforated metal core 13, a suitable filtering medium 14 surrounding the core 13, and adhesive potting material 15,21. The open end of the element is assembled in a fashion known in the art. The perforated core 13 and filtering medium 14 are potted utilizing adhesive 15,21 in endcaps 11,12 and 16. In the present invention, endcap 16, a structural part of the housing 1,4,7,16 is used as the closed end of the internal filtering element 11,12,13, 14,15,16. The core 13 and the filtering medium 14 of the internal filtering element are potted in the closed end of the housing 1,4,7,16. This particular method of constructing the internal filter assembly as a unitary component of the structural filter housing is a critical feature of the present invention. This feature results in several positive improvements over prior art, such as: it eliminations the need for certain separator devices, springs, pressure equalization passages, or spacers; it eliminates the need for one internal element endcap; it stabilizes the internal element against movement caused by applicational flow variations and vibration; it extends seal life and improves seal performance by protecting the internal element against movement during operation; and among other less immediately recognizable benefits, this method improves the solid particulate removal efficiency of the filter medium by stabilizing the internal element.

From the foregoing, it will thus be apparent that the present invention comprises a spin-on filter capable of improved performance over prior art in a variety of applications including, but not limited to, high pressure, high-strength, quick change, and disposable. Additional advantages will be evident to those skilled in the art.

Although particular embodiments of the invention have been illustrated in the accompanying Drawings and described in the foregoing Detailed Description, it will be understood that the invention is not limited only to the embodiments disclosed, but is intended only to embrace any alternatives, equivalents, modifications and/or rearrangements of filters, filter housings, filter elements, or any part thereof falling within the scope of the present invention as defined by the following claims.

What I claim is:

1. A high pressure quick change filter device comprising a tubular metal housing having first and second ends; a first metal end cap secured to the first end of the housing by the housing being folded inwardly over the periphery of the first end cap; a tubular filter element having first and second ends disposed within the housing, said tubular filter element first end bonded to said first end cap, said tubular filter element second end comprising a second metal end cap; and a threaded head assembly sealing said second metal housing end, said threaded head assembly comprising means defining plural circumferentially arranged inlet openings and a central outlet opening, said outlet central opening coaxially aligned with said second metal end cap.

2. The filter device of claim 1, wherein the edge of the inwardly folded housing engages each said first end cap in a recessed receiving area, and is held by a circumferential weld at the innermost edge of the folded housing.

3. The filter device of claim 1, wherein said outlet opening means concentrically receives an internally threaded connector post.

4. The filter device of claim 3, wherein the threaded connector post receives a retaining ring and O-ring to fluidly seal the tubular filter element against the connector post.

5. The filter device of any one of the claims 1-4, wherein said tubular filter element comprises a perforated core surrounded by a suitable filtering media, and said tubular filter element is bonded to said first end cap by a potting material.

* * * * *